United States Patent
van Diggelen et al.

(10) Patent No.: US 7,253,768 B2
(45) Date of Patent: Aug. 7, 2007

(54) METHOD AND APPARATUS FOR MITIGATING MULTIPATH EFFECTS AT A SATELLITE SIGNAL RECEIVER USING A SEQUENTIAL ESTIMATION FILTER

(75) Inventors: Frank van Diggelen, San Jose, CA (US); Charles Abraham, Los Gatos, CA (US); Sergei Podshivalvo, San Jose, CA (US)

(73) Assignee: Global Locate, Inc, San Jose, CA (US)

( * ) Notice: Subject to any disclaimer, the term of this patent is extended or adjusted under 35 U.S.C. 154(b) by 0 days.

(21) Appl. No.: 11/428,127

(22) Filed: Jun. 30, 2006

(65) Prior Publication Data
US 2007/0096978 A1    May 3, 2007

Related U.S. Application Data

(63) Continuation of application No. 11/259,767, filed on Oct. 27, 2005, now Pat. No. 7,095,370.

(51) Int. Cl.
*G01S 1/00* (2006.01)
(52) U.S. Cl. .............................. 342/357.02; 342/357.12
(58) Field of Classification Search ............ 342/357.02, 342/357.06, 357.12, 357.15; 701/207, 213, 701/215
See application file for complete search history.

(56) References Cited

U.S. PATENT DOCUMENTS

| | | | |
|---|---|---|---|
| 5,202,829 A | | 4/1993 | Geier |
| 5,621,646 A | * | 4/1997 | Enge et al. .................. 701/120 |
| 6,198,430 B1 | * | 3/2001 | Hwang et al. .......... 342/357.03 |
| 6,853,916 B2 | | 2/2005 | Fuchs et al. |
| 7,095,370 B1 | * | 8/2006 | van Diggelen et al. . 342/357.02 |
| 2005/0212696 A1 | | 9/2005 | Bartone et al. |
| 2006/0017610 A1 | | 1/2006 | Komjathy et al. |

* cited by examiner

*Primary Examiner*—Dao L. Phan
(74) *Attorney, Agent, or Firm*—Moser IP Law Group

(57) ABSTRACT

A method and apparatus for mitigating multipath effects in a satellite signal receiver is described. The method includes computing at least one pseudorange residual as a function of (i) a measured pseudorange to a given satellite, and (ii) an expected pseudorange to the given satellite, which is derived by mathematically projecting a pseudorange to the given satellite. The method also includes applying the measured pseudorange to a sequential-estimation filter, which is configured to solve a navigation-solution problem, when the pseudorange residual satisfies a given threshold.

22 Claims, 3 Drawing Sheets

METHOD AND APPARATUS FOR MITIGATING MULTIPATH EFFECTS AT A SATELLITE SIGNAL RECEIVER USING A SEQUENTIAL ESTIMATION FILTER

BACKGROUND OF THE INVENTION

1. Field of the Invention

The present invention generally relates to a position location system and, more particularly, to a method and apparatus for mitigating multipath effects at a satellite signal receiver.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. The GPS satellites transmit to the receivers satellite-positioning data, so called "ephemeris" data. In addition to the ephemeris data, the satellites transmit to the receiver absolute time information associated with the satellite signal, i.e., the absolute time signal is sent as a second of the week signal. This absolute time signal allows the receiver to unambiguously determine a time tag for when each received signal was transmitted by each satellite. By knowing the exact time of transmission of each of the signals, the receiver uses the ephemeris data to calculate where each satellite was when it transmitted a signal. Finally, the receiver combines the knowledge of satellite positions with the computed distances to the satellites to compute the receiver position.

More specifically, GPS receivers receive GPS signals transmitted from orbiting GPS satellites containing unique pseudo-random noise (PN) codes. The GPS receivers determine the time delays between transmission and reception of the signals by comparing time shifts between the received PN code signal sequence and internally generated PN signal sequences.

Each transmitted GPS signal is a direct sequence spread spectrum signal. The signals available for commercial use are provided by the Standard Positioning Service. These signals utilize a direct sequence spreading signal with a 1.023 MHz spread rate on a carrier at 1575.42 MHz (the L1 frequency). Each satellite transmits a unique PN code (known as the C/A code) that identifies the particular satellite, and allows signals transmitted simultaneously from several satellites to be received simultaneously by a receiver with very little interference of any one signal by another. The PN code sequence length is 1023 chips, corresponding to a 1 millisecond time period. One cycle of 1023 chips is called a PN frame.

Each received GPS signal is constructed from the 1.023 MHz repetitive PN pattern of 1023 chips. At very low signal levels, the PN pattern may still be observed, to provide unambiguous time delay measurements, by processing, and essentially averaging, many PN frames. These measured time delays are called "sub-millisecond pseudoranges", since they are known modulo the 1 millisecond PN frame boundaries. By resolving the integer number of milliseconds associated with each delay to each satellite, then one has true, unambiguous, pseudoranges. The process of resolving the unambiguous pseudoranges is known as "integer millisecond ambiguity resolution". A set of four pseudoranges together with the knowledge of the absolute times of transmissions of the GPS signals and satellite positions at those absolute times is sufficient to solve for the position of the GPS receiver. The absolute times of transmission are needed in order to determine the positions of the satellites at the times of transmission and hence to determine the position of the GPS receiver.

The process of measuring pseudoranges in a GPS receiver begins with a procedure to search for the GPS signals in the presence of noise by attempting a series of correlations of the incoming signal against the PN codes. The search process can be lengthy, as both the exact frequency of the signal and the time-of-arrival delay are unknown. To find the signal, GPS receivers traditionally conduct a two dimensional search, checking each delay possibility at every possible frequency. To test for the presence of a signal at a particular frequency and delay, the GPS receiver is tuned to the frequency, and the incoming signal is correlated with the known PN code delayed by an amount corresponding to the time of arrival. If no signal is detected, the search continues to the next delay possibility, and after all delay possibilities are checked, continues to the next frequency possibility. Each individual correlation is performed over one or more milliseconds in order to allow sufficient signal averaging to distinguish the signal from the noise. A correlation between the incoming signal and the PN code results in a "peak" at the code delay position where the PN code of the incoming signal matches the known PN code.

Conventionally, GPS receivers use few correlators per channel to track the GPS PN codes, such as one early-late (E-L) correlator pair per channel. E-L correlator spacing is usually from ±0.5 PN code chips to ±0.05 code chips. Blockage of the direct satellite signal will cause the true correlation peak to fade, while the presence of a reflected signal will cause a false peak to appear offset from the true peak. If the true correlation peak fades, and a reflected signal causes a false peak to appear more than 0.5 chips away from the (now invisible) true peak, then this reflected signal is invisible to the E-L correlator pair and it causes no measurement error. However, upon initially searching for a GPS signal (as opposed to tracking a GPS signal), E-L correlator pairs are susceptible to large errors if only the reflected signals are visible. Moreover, E-L correlator pairs do not provide for high sensitivity in low signal-to-noise ratio environments.

To increase sensitivity at the GPS receiver, designers add additional correlators per channel. For a given sensitivity level, the addition of correlators decreases search times in proportion to the number of additional correlators added to the channel. In contrast to an E-L correlator pair, however, a GPS receiver with a large number of correlators per channel will "see" a false peak from a reflected signal, even if the reflected signal suddenly appears more than one chip away from the true peak. Since the false peak is visible, the GPS receiver may produce erroneous measurements. When one or more reflected signals are received by the receiver, the signals form "multipath" components that can result in one or more false peaks or peak distortion. There are known techniques for mitigating multipath effects when the reflected signal overlaps a direct signal, causing a distortion in the correlation peak. These techniques, usually based on narrow correlator spacing, somewhat mitigate the distortion effect of multipath components in the presence of a direct-path signal. However, in some instances of receiver use, the entire direct signal path may be blocked resulting in the receiver only receiving the reflected signals. In those instances, the existing techniques are ineffective at mitigating reception errors do to multipath components.

Accordingly, there exists a need in the art for an improved method and apparatus for mitigating multipath effects at a satellite signal receiver.

SUMMARY OF THE INVENTION

A method and apparatus for mitigating multipath effects in a satellite signal receiver is described. In one embodiment, measured pseudoranges are obtained from the satellite signal receiver to a plurality of satellites. For each measured pseudorange: an expected pseudorange is derived from a sequential estimation filter in the satellite signal receiver. The measured pseudorange and the expected pseudorange are differenced to compute a pseudorange residual. The measured pseudorange is applied to the sequential estimation filter only if the pseudorange residual is within a range window.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

A method and apparatus for mitigating multipath effects at a satellite signal receiver is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals.

Figure 1:
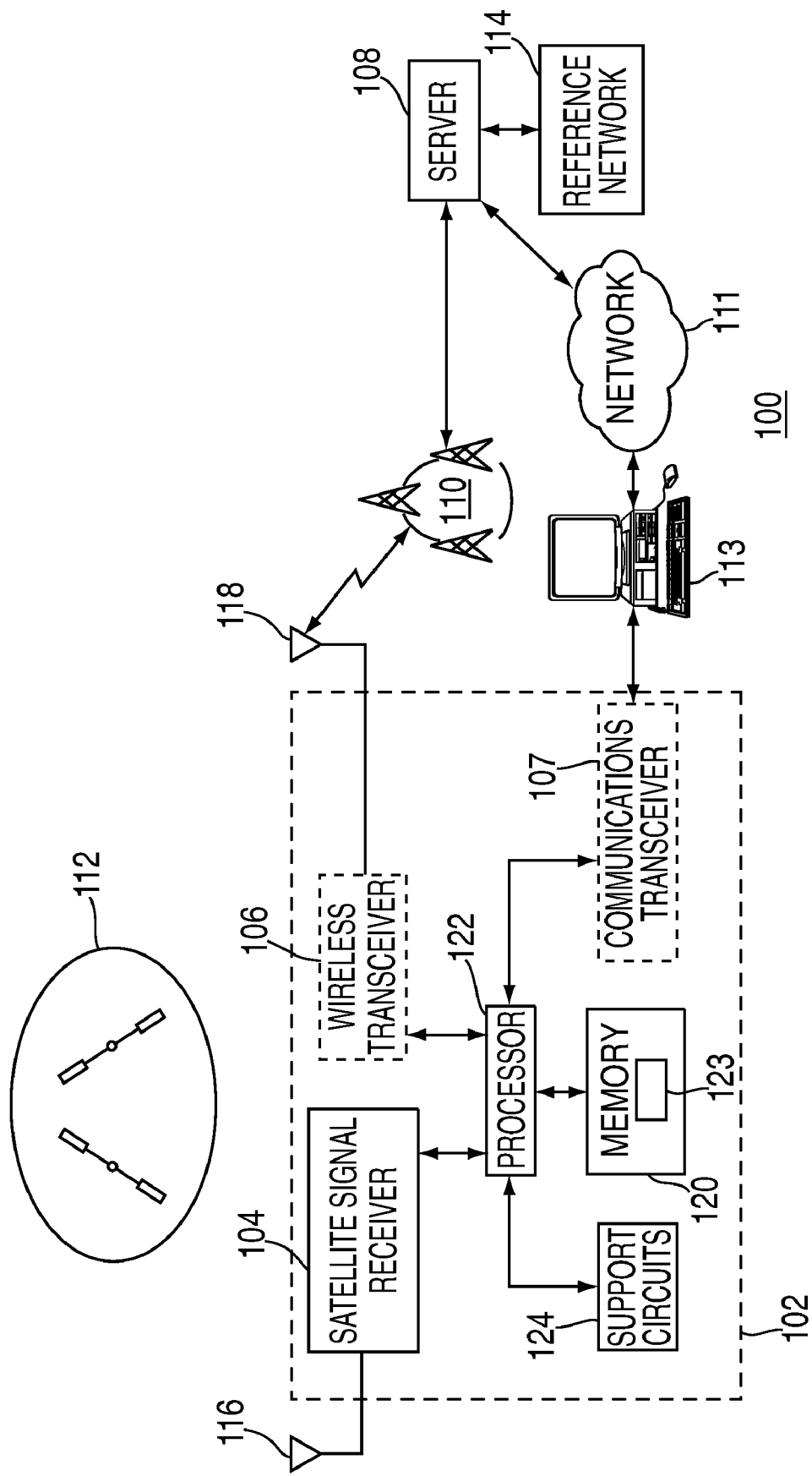
FIG. 1 is a block diagram depicting an exemplary embodiment of a position location system.

FIG. 1 is a block diagram depicting an exemplary embodiment of a position location system 100. The system 100 comprises an SPS receiver 102 and a server 108. The SPS receiver 102 is configured to receive satellite signals from a plurality of satellites 112 in a constellation of satellites. The SPS receiver 102 processes the received signals to produce satellite measurement data (e.g., pseudoranges, range-rate measurements) with respect to the satellites 112. In one embodiment, the SPS receiver 102 receives assistance data from the server 108. The SPS receiver 102 may communicate with the server 108 via a wireless network 110, a wired network 111, or both. Notably, the SPS receiver 102 may be configured for direct communication with the wired network 111 or for indirect communication through a computer 113. The wireless network 110 may comprise any type of wireless network known in the art, such as a cellular telephone network. The wired network 111 may comprise any type of wired network known in the art, such as the Internet.

The present invention is used to mitigate multipath effects for SPS receivers or assisted-SPS receivers. The wireless transceiver 106 and the communications transceiver 107 are shown in phantom to exemplify that these components are optional. The following disclosure focuses on an embodiment of the invention that utilizes assisted SPS techniques. Those skilled in the art should realize that the invention will also function as described herein within a conventional SPS receiver.

Satellite position information, such as ephemeris for at least the satellites 112, may be collected by a network of tracking stations ("reference network 114"). The reference network 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

The SPS receiver 102 may use the assistance data to aid in acquisition of the satellite signals and/or to compute position. The assistance data may include satellite position information (e.g., ephemeris data or other type of satellite orbit model), expected code phase, expected Doppler, a pseudorange model, and like type assistance data known in the art, as well as any combination of such data. In one embodiment, the SPS receiver 102 computes its own position using the satellite measurement data and the assistance data (e.g., a mobile station based or MS-Based configuration). In another embodiment, the SPS receiver 102 sends the satellite measurement data to the server 108 and the server 108 computes position of the SPS receiver (e.g., a mobile station assisted or MS-Assisted configuration).

Although the position location system 100 is shown as an Assisted GPS (A-GPS) system having a server, it is to be understood that the SPS receiver 102 may operate autonomously without receiving assistance data from the server 108. That is, in another embodiment, there is no communication between the SPS receiver 102 and the server 108 and the SPS receiver 102 does not receive assistance data. Instead, the SPS receiver 102 receives satellite position information by decoding the satellite signals to recover satellite navigation data using a well known decoding process. The SPS receiver 102 then computes its own position using the satellite measurement data and the satellite navigation data.

In one embodiment, the SPS receiver 102 includes a satellite signal receiver 104, a wireless transceiver 106, a processor 122, support circuits 124, a communications transceiver 107, and a memory 120. The satellite signal receiver 104 receives the satellite signals from the satellites 112 using an antenna 116 and obtains the satellite measurement data. The satellite signal receiver 104 may comprise a conventional GPS receiver or A-GPS receiver. An exemplary A-GPS receiver is described in commonly-assigned U.S. Pat. No. 6,453,237, issued Sep. 17, 2002, which is incorporated by reference herein in its entirety. Notably, the satellite signal receiver 104 includes a parallel correlator 105 for detecting the satellite signals using a well-known correlation process. An exemplary parallel correlator is described in commonly-assigned U.S. Pat. No. 6,606,346, issued Aug. 12, 2003, which is incorporated by reference herein in its entirety.

The wireless transceiver 106 is configured for communication with the wireless network 110 via an antenna 118. The communications transceiver 107 may comprise a modem or the like for direct communication with the wired network 111, or may comprise a serial transceiver or the like for communicating with the computer 113. Although the SPS receiver 102 is shown as having both a wireless transceiver and a communications transceiver, those skilled in the art will appreciate that the SPS receiver 102 may be configured with only the wireless transceiver 106 or only the communications transceiver 107. The satellite signal receiver 104, the wireless transceiver 106, and the communications transceiver 107 are controlled by the processor 122. For purposes of clarity by example, the SPS receiver 102 is shown as an assisted-SPS receiver. Those skilled in the art will appreciate, however, that the invention described herein may be used in a conventional autonomous SPS receiver (e.g., a receiver without a wireless transceiver or communications transceiver) that does not utilize assistance data.

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. Various processes and methods described herein may be implemented via software stored in the memory 120 for execution by the processor 122. Notably, the memory 120 may store program code for implementing a sequential estimation filter 123, such as a Kalman filter. Alternatively, such processes and methods may be implemented using dedicated hardware, such as an application specific integrated circuit (ASIC), or a combination of hardware and software. The support circuits 124 include conventional cache, power supplies, clock circuits, data registers, I/O circuitry, and the like to facilitate operation of the SPS receiver 102.

In the general satellite navigation problem, there are nine unknowns:

Three position unknowns: x, y, z

Three velocity unknowns: $\dot{x}, \dot{y}, \dot{z}$

Three clock unknowns: $t_c, t_s, f_c$ where $t_c$ is the common mode timing error (usually a sub-millisecond value in GPS), $t_s$ is the absolute time tag error, and $f_c$ is the frequency error in a local oscillator within the SPS receiver 102. The sequential estimation filter 123 includes a plurality of states for modeling some or all of these unknowns. Satellite measurement data is applied to the sequential estimation filter 123. Multiple measurement sets may be used to update the states of the sequential estimation filter 123. The update applies proportional weighting to both the current state information and the measurements to produce new state information. For purposes of clarity by example, the sequential estimation filter 123 is described below as being a Kalman filter ("Kalman filter 123"). It is to be understood, however, that other types of sequential estimation filters may be employed that are known in the art, such as Batch Filters.

In particular, the Kalman filter 123 employs a linear dynamic model of a discrete GPS system. The GPS system is modeled by several states. In one embodiment, the states may be: position in three dimensions x, y, and z and common mode error. As is well known in the art, more states may be added, e.g., velocity states, clock frequency states, etc., without changing the nature of the current invention or the description that follows.

A linear dynamic model $\Phi$ relates the states of the Kalman filter 123 at one discrete time interval, represented by the vector $x_k$ (current state vector), to the previous states of the Kalman filter 123, represented by the vector $x_{k-1}$ (previous state vector), according to the following relationship:

$$x_k = \Phi_{k-1} x_{k-1} + w_{k-1}, E\{ww^T\} = Q,$$

where $w_{k-1}$ is the process noise associated with the dynamic model and Q is the covariance of the process noise (also referred to herein as the "state driving noise"). The matrix Q is a measure of how well $x_k$ is known given $x_{k-1}$ in the absence of measurements from the SPS receiver 102.

The SPS receiver 102 computes a set of measurements $z_k$. In GPS, the relationship between the measurements obtained by the SPS receiver 102 and the states of the Kalman filter 123 is non-linear and may be specified in terms of the following:

$$z_k = h(x_k) + v_k, E\{vv^T\} = R,$$

where h denotes the non-linear model, $v_k$ denotes the noise on the satellite measurements, and R is the covariance of the receiver measurement noise.

Each iteration of the Kalman filter 123 begins by predicting the state values at the next time interval as follows:

$$\hat{x}_{k-} = \Phi_{k-1} \hat{x}_{k-1(+)}, E\{(\hat{x}-x)(\hat{x}-x)^T\} = P,$$

where $\hat{x}_{k-}$ is a vector of the predicted states at one time interval, $\hat{x}_{k-1(+)}$ is a vector of the calculated states at the previous time interval, and P is the covariance of the difference between the estimated states and the actual states.

The updated state estimate is used to generate a prediction of the measurements as follows:

$$\hat{z}_k = h_k(\hat{x}_{k-}),$$

where $\hat{z}_k$ is a vector representing the predicted measurements. Notably, if $z_k$ includes a set of pseudorange measurements, $\hat{z}_k$ includes a set of expected pseudoranges. Simultaneously, the state error covariance is extrapolated as follows:

$$P_{k-} = \Phi_{k-1} P_{k-1} \Phi_{k-1}^T + Q_{k-1}.$$

In addition, the Kalman gain matrix is computed as follows:

$$K_k = P_{k-} H_k^T (H_k P_{k-} H_k^T + R_k)^{-1} H_k = \partial h_k / \partial x |_{x=\hat{x}}^{k-},$$

where H denotes a linearized form of the non-linear model h.

The Kalman gain is used to adjust the state estimates based on the difference between the observed and predicted measurements as follows:

$$\hat{x}_{k+} = \hat{x}_{k-} + K_k (z_k - \hat{z}_k).$$

Notably, if $z_k$ includes a set of pseudorange measurements, $z_k - \hat{z}_k$ represents a set of pseudorange residuals (i.e., differences between measured pseudoranges and expected pseudoranges). Finally, the a-posteriori state covariance is computed in accordance with the following:

$$P_{k+} = (I - K_k H_k) P_{k-},$$

where I denotes the identity matrix.

The linearized measurement model depends on the type of measurements incorporated into the Kalman filter 123. The primary filter inputs are the measurements (e.g., pseudorange measurements, such as sub-millisecond pseudoranges) from the SPS receiver 102. In this case, the matrix H contains the line of sight vector, as is well understood by those skilled in the art.

In one embodiment of the invention, a given pseudorange measurement is only applied to the sequential estimation filter 123 if its associated pseudorange residual is within a pre-defined window (i.e., within +/− a fraction of a chip of the expected delay). If the pseudorange residual associated with a pseudorange measurement is outside of the window, it is assumed that the pseudorange measurement is erroneous in that the parallel correlator 105 has detected a false peak, possibly due to a reflected signal, rather than the true peak for the direct signal. As such, the values of the pseudorange residuals are used to identify erroneous pseudoranges before those erroneous pseudoranges are used to compute a position for the SPS receiver.

In effect, the pseudorange measurements are passed through a filter before being applied to the sequential estimation filter 123. The "width" of the filter is a design parameter. The width of the filter may be set to "filter out" more or fewer pseudorange measurements, as desired. However, if the filter width is too small of a value (i.e., the filter is too narrow), a majority of the pseudorange measurements may be discarded and the sequential estimation filter 123 may not be updated frequently enough. Alternatively, if the filter is too wide, erroneous pseudorange measurements may slip through and be applied to the sequential estimation filter. In one embodiment, the filter width is plus or minus 100 meters. However, those skilled in the art will appreciate that the thresholds may be more or less restrictive. Also, the thresholds that define the window may be variable. As such, the invention may change the thresholds depending on factors such as the magnitude of the covariance of the estimated states. For example, if the current states are well known, then the thresholds (window size) can be tightened, and if the current states are not well known, then the thresholds can be relaxed. In this way, if the thresholds are too tight, and the Kalman filter is starved of measurements, the invention will automatically compensate, since the Kalman filter covariance will grow in the absence of new measurements, and the thresholds will be relaxed (increased) until new measurements are accepted. In an alternative embodiment the thresholds could be adjusted depending upon the number of satellites in view, the Dilution of Precision (DOP), other measures of signal quality (such as SNR), or a combination of these.

Figure 2:
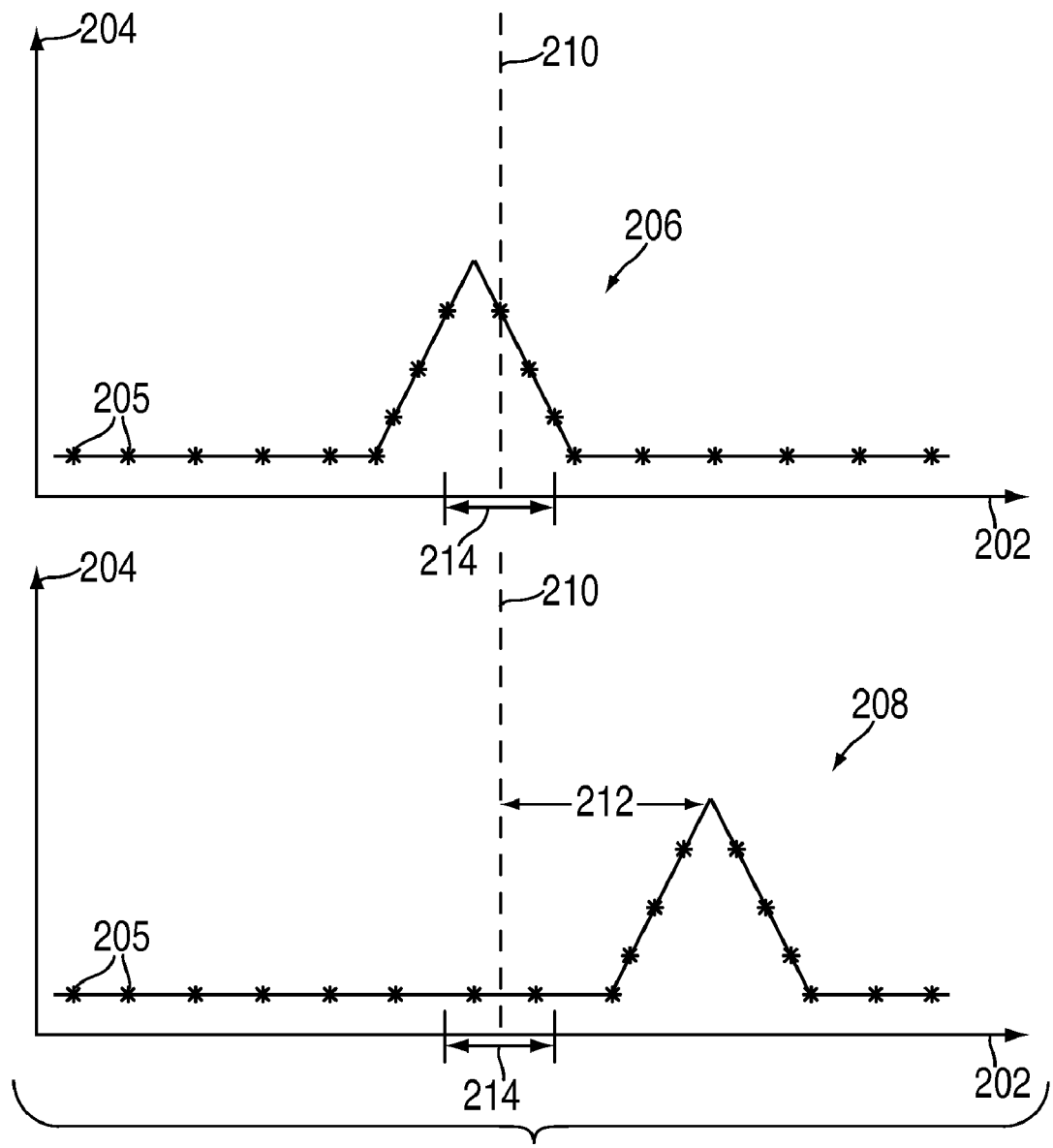
FIG. 2 is a graph depicting an illustrative correlation responses produced by a parallel correlator.

FIG. 2 is a graph depicting an illustrative correlation responses produced by the parallel correlator 105. Axes 202 represent delay of the satellite signal, and axes 204 represent the magnitude of the correlation. Signal samples 205 on the axes 202 are spaced at an interval equal to the PN code chip length divided by a number P, which is the ratio of the signal sampling rate in the satellite signal receiver 104 (a design parameter) and the PN code chipping rate (e.g., 1.023 MHz for the C/A code in GPS). For example, if P=2, the signal samples 205 are spaced at ½ chip intervals or approximately 500 ns (i.e., two samples per PN code chip). A correlation response 206 corresponds to a case where the SPS receiver 102 receives a direct satellite signal, i.e., response 206 represents a correlation peak at the true delay. A correlation response 208 corresponds to an alternative case where the SPS receiver 102 receives only a reflected version of the satellite signal (the direct signal is blocked), i.e., response 208 represents a correlation peak at an incorrect delay.

In each of the correlation responses 206 and 208, dashed line 210 corresponds to the expected delay, i.e., the delay that is expected by the Kalman filter based on the prior delays. In the correlation response 206, the peak is located close to the expected delay. In the correlation response 208, the peak is located a distance 212 from the expected delay. Using the method described herein, a filter may be established having a window 214 that straddles the expected delay. The width of the window 214 (e.g., +/−⅓ of a chip width representing an error of about 100 meters) dictates whether or not a pseudorange measurement corresponding to the correlation response is rejected by the filter. As shown, the peak of the correlation response 206 is within the window 214 and thus the corresponding pseudorange will pass through the filter. The peak of the correlation response 208 falls outside the window 214 and thus the corresponding pseudorange will be rejected by the filter.

The window 214 is defined by two threshold limits, a positive limit and a negative limit. The window may be asymmetric to reflect the fact that reflected signals always produce longer path lengths, and hence larger pseudoranges. In the embodiment of FIG. 2, the window 214 is defined by a pair of symmetric thresholds space ±⅓ of a chip width. In an alternative embodiment, the thresholds may be asymmetric, e.g., −⅓ and +⅕ of a chip width. Since reflections will be late, skewing the window may capture more correlation peaks, and cause fewer false alarms, i.e., rejected correlation peaks that are not applied to the filter. In yet another embodiment the window may have no left side limit at all, since reflections are always expected later than the true signals. However, some limit on the left side of the window is often desirable, since there may be other causes of measurement errors, not just reflections, and in this case it is desirable that the window exclude these too.

Figure 3:
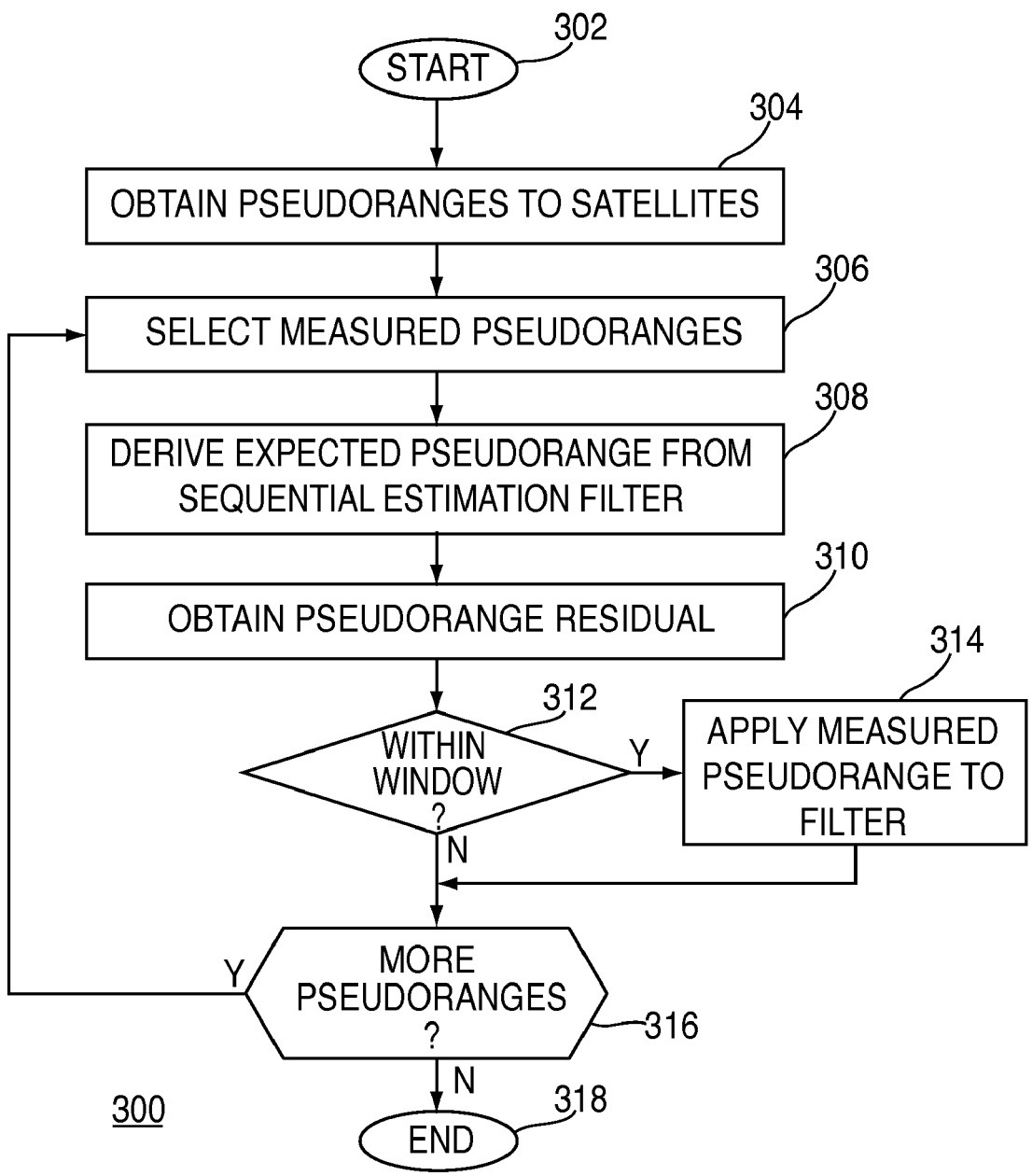
FIG. 3 is a flow diagram depicting an exemplary embodiment of a method for mitigating multipath effects at a satellite signal receiver in accordance with the invention.

FIG. 3 is a flow diagram depicting an exemplary embodiment of a method 300 for mitigating multipath effects at a satellite signal receiver in accordance with the invention. The method 300 begins at step 302. At step 304, pseudoranges from the satellite signal receiver to a plurality of satellites are obtained. At step 306, a measured pseudorange is selected. At step 308, an expected pseudorange is derived from a sequential estimation filter for the selected pseudorange. At step 310, a pseudorange residual is computed for the selected pseudorange. At step 312, a determination is made whether the pseudorange residual within the window 214. If so, the method 300 proceeds to step 314, where the measured pseudorange is applied to the sequential estimation filter. In particular, the state vector of the sequential estimation filter is updated using the measured pseudorange.

If, at step 312, the pseudorange residual is not within the window, the method 300 proceeds to step 316. The residual may have a positive or negative value. The window thresholds (i.e., the limits that form the window) may be variable or fixed. If variable, the threshold may be adjusted in view of the magnitude of the covariance of the estimated states. As discussed above, if the current states are well known, then the thresholds can be tightened, and if the current states are not well known, then the thresholds can be relaxed. In an alternative embodiment the threshold could be adjusted depending upon the number of satellites in view, the Dilution of Precision (DOP), other measures of signal quality (such as SNR), or a combination of these.

At step 316, a determination is made whether there are more measured pseudoranges to process. If so, the method 300 returns to step 306 and another pseudorange is selected. Otherwise, the method 300 ends at step 318.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to embodiments of the present invention, other and further embodiments of the invention may be devised without departing from the basic scope thereof, and the scope thereof is determined by the claims that follow.

We claim:

1. A method for mitigating multipath effects in a satellite-signal receiver, comprising:
   computing at least one pseudorange residual as a function of a measured pseudorange to a given satellite and an expected pseudorange to the given satellite, wherein the expected pseudorange is derived by mathematically projecting a pseudorange to the given satellite; and
   when the pseudorange residual satisfies a given threshold, applying the measured pseudorange to a sequential-estimation filter for solving a navigation-solution problem.

2. The method of claim 1, further comprising: deriving the expected pseudorange by applying to another sequential-estimation filter at least one a-priori parameter for mathematically projecting the pseudorange to the given satellite.

3. The method of claim 1, wherein the measured pseudorange comprises a sub-millisecond pseudorange.

4. The method of claim 1, wherein the sequential estimation filter comprises any of a Kalman filter and a batch filter.

5. The method of claim 1, further comprising: applying the pseudorange residual to the given threshold.

6. The method of claim 1, further comprising: applying the pseudorange residual to the given threshold, wherein the threshold defines a range of values, and wherein the pseudorange residual satisfies the given threshold when the pseudorange residual has a value that is within the range of values.

7. The method of claim 6, further comprising adjusting the range of values.

8. The method of claim 7, wherein adjusting the range of values comprises reducing the range of values by some amount of values when at least one current state of the sequential-estimation filter is known.

9. The method of claim 8, wherein the at least one current state comprises a magnitude of a covariance of an estimated state.

10. The method of claim 7, wherein adjusting the range of values comprises enlarging the range of values by an amount of values when at least one current state of the sequential-estimation filter is not known.

11. The method of claim 10, wherein the at least one current state comprises a magnitude of a covariance of an estimated state.

12. The method of claim 7, wherein the adjusting the range of values comprises any of reducing and enlarging the range of values by an amount of values in response to a number of satellites in view of the satellite-signal receiver, a Dilution of Precision, signal quality, and combination thereof.

13. The method of claim 6, wherein the range of values comprises a range between about a negative 100 meters and positive 100 meters.

14. An apparatus for mitigating multipath effects in a satellite-signal receiver, comprising:
   memory operable to store executable instructions; and
   a processor operable to obtain from the memory the executable instruction and execute the executable instructions to:
   compute at least one pseudorange residual as a function of a measured pseudorange to a given satellite and an expected pseudorange to the given satellite, wherein the expected pseudorange is derived by mathematically projecting a pseudorange to the given satellite; and
   apply the measured pseudorange to a sequential-estimation filter for solving a navigation-solution problem when the pseudorange residual satisfies a given threshold.

15. The apparatus of claim 14, wherein the processor is further operable to execute the executable instructions to: derive the expected pseudorange by applying to another sequential-estimation filter at least one a-priori parameter for mathematically projecting the pseudorange to the given satellite.

16. The apparatus of claim 14, wherein the processor is further operable to execute the executable instructions to: apply the pseudorange residual to the given threshold.

17. The apparatus of claim 14, wherein the processor is further operable to execute the executable instructions to: apply the pseudorange residual to the given threshold, wherein the threshold defines a range of values, and wherein the pseudorange residual satisfies the given threshold when the pseudorange residual has a value that is within the range of values.

18. The apparatus of claim 14, wherein the processor is further operable to execute the executable instructions to: adjust the range of values.

19. The apparatus of claim 14, wherein the processor is further operable to execute the executable instructions to: reduce the range of values by some amount of values when at least one current state of the sequential-estimation filter is known.

20. The apparatus of claim 14, wherein the processor is further operable to execute the executable instructions to: enlarge the range of values by an amount of values when at least one current state of the sequential-estimation filter is not known.

21. A mobile device, comprising:
   a satellite signal receiver operable to process signals from at least one satellite to obtain a measured pseudorange; and
   a processor operable to compute at least one pseudorange residual as a function of a measured pseudorange to a given satellite and an expected pseudorange to the given satellite, wherein the expected pseudorange is derived by mathematically projecting a pseudorange to the given satellite; and to apply the measured pseudorange to a sequential-estimation filter for solving a navigation-solution problem when the pseudorange residual satisfies a given threshold.

22. The mobile device of claim 21, wherein the processor is further operable to derive the expected pseudorange by applying to another sequential-estimation filter at least one a-priori parameter for mathematically projecting the pseudorange to the given satellite.

* * * * *